USO05333705A

United States Patent [19]
Lemaire et al.

[11] Patent Number: 5,333,705
[45] Date of Patent: Aug. 2, 1994

[54] ASSEMBLY OF A HYDRAULIC MOTOR AND BRAKE

[75] Inventors: Gilles Lemaire, Margny Les Compiegne; Marc Perot, Eve, both of France

[73] Assignee: Poclain Hydraulics, Verberie, France

[21] Appl. No.: 972,245

[22] Filed: Nov. 5, 1992

[30] Foreign Application Priority Data

Nov. 20, 1991 [FR] France ................. 91 14339

[51] Int. Cl.⁵ .................... B60T 1/06; B60K 7/00
[52] U.S. Cl. ................. 188/71.5; 188/72.1; 188/170
[58] Field of Search ........... 188/71.5, 72.1, 71.1, 188/170, 369, 381, 70 R, 67, 68, 69

[56] References Cited

U.S. PATENT DOCUMENTS

| | | | |
|---|---|---|---|
| 4,540,073 | 9/1985 | Rogier | 188/71.5 X |
| 4,607,730 | 8/1986 | Paisley | 188/72.1 X |
| 4,723,636 | 2/1988 | Lallier | 188/72.1 X |
| 5,115,890 | 5/1992 | Noel | 188/71.5 |

FOREIGN PATENT DOCUMENTS

| | | |
|---|---|---|
| 0046955 | 2/1988 | Japan ................. 188/71.5 |
| 1559276 | 1/1980 | United Kingdom . |
| 2178809 | 2/1987 | United Kingdom . |
| 2239907 | 7/1991 | United Kingdom . |

*Primary Examiner*—Robert J. Oberleitner
*Assistant Examiner*—Peter M. Poon
*Attorney, Agent, or Firm*—Ladas & Parry

[57] ABSTRACT

The assembly of a hydraulic motor and of a brake, comprising a frame; a cylinder-block mounted to rotate via a bearing and provided with a communication face; a fluid distributor valve provided with a distribution face in abutment against the communication face of the cylinder-block. A plurality of braking members are provided, some fast with the frame, the others fast with a brake shaft itself fast in rotation with the cylinder-block. An axial thrust braking member and a brake-release jack are coupled between the frame and the brake shaft. The brake shaft is fast in translation with the cylinder-block in the direction opposite that of the thrust force producing abutment of the distribution face against the communication face.

15 Claims, 5 Drawing Sheets

ASSEMBLY OF A HYDRAULIC MOTOR AND BRAKE

FIELD OF THE INVENTION

The present invention relates to a hydraulic motor/brake assembly.

BACKGROUND OF THE INVENTION

An assembly of a hydraulic motor and of a brake is already known, comprising: a motor frame; a cylinder-block mounted to rotate about an axis of rotation and maintained axially in position at least in one direction with respect to the frame by means of a bearing device, and provided with a plane communication face perpendicular to the axis of rotation; an internal fluid distributor valve, provided with a plane distribution face, generally in abutment on the communication face of the cylinder-block, jacks capable of containing fluids under pressure, being interposed between the frame and the internal fluid distributor valve and capable of generating a thrust for abutment of the distribution face against the communication face; two groups of braking members fast in rotation, the braking members of a first of the two groups with the motor frame, and the braking members of the second group with a brake shaft itself fast in rotation with the cylinder block; an axial thrust member for controlling braking, with displacement parallel to the axis of rotation, coupled to the brake shaft so as to be fast therewith with respect to a translation of said thrust member parallel to the axis of rotation, of direction opposite that of the thrust for abutment of the distribution face against the communication face; a device for controlling the braking coupled to the thrust member and capable of generating thereon an axial braking thrust; and a brake-release jack coupled between the motor frame and the thrust member, with effect antagonistic to that of the braking control device, capable of generating on the thrust member an axial thrust of direction opposite that of the thrust for abutment of the distribution face against the communication face.

It is ascertained that the bearing device must be capable of withstanding a considerable axial thrust: that transmitted to the cylinder-block by the internal fluid distributor valve during abutment of the distribution face of the internal distributor valve on the communication face of the cylinder-block. The dimensions of the bearing device might be reduced or its operative life might be increased if, during nominal running of the motor, with the maximum nominal pressure provided, an effort antagonistic to that of said thrust for abutment of the distribution face on the communication face were developed and applied to the cylinder-block to reduce and even cancel the effect of said thrust.

It is also ascertained that, in an assembly of a motor and of a brake, the motor may function only if the action of the brake is cancelled or only when an effort of brake-release is generated.

The invention contemplates bringing these observations together and, by transmitting in the appropriate direction the brake-release effort which exists simultaneously with the thrust for abutment of the distribution face of the internal distributor valve on the communication face of the cylinder-block, in obtaining the partial or total neutralization of the latter by the former.

SUMMARY OF THE INVENTION

To that end, in an assembly of a hydraulic motor and of a brake as defined hereinabove, according to the invention the brake shaft is capable of being rendered fast, with respect to a translation of said brake shaft parallel to the axis of rotation, with the cylinder-block, in the direction opposite that of the thrust producing abutment of the distribution face against the communication face.

The following advantageous arrangements are, in addition, preferably adopted:
   according to one embodiment, the motor comprises an output shaft which is mounted to rotate and maintained axially in position with respect to the motor frame via said bearing device, while the cylinder-block is fast with respect to rotation with said output shaft and is capable of being rendered fast with said output shaft with respect to a translation of said output shaft parallel to the axis of rotation, at least in the direction opposite that of the possible thrust for abutment of the distribution face against the communication face;
   the brake shaft is fast with the output shaft with respect to a translation of said brake shaft parallel to the axis of rotation, at least in the direction opposite that of the possible thrust for abutment of the distribution face against the communication face;
   the brake shaft and the output shaft constitute a single shaft;
   according to another embodiment, the bearing device is directly interposed between the motor frame and the cylinder-block, and a shoulder, fast with the brake shaft, is capable of being placed in axial abutment against the cylinder-block during a translation of said brake shaft in a direction opposite that of the possible thrust of abutment of the distribution face against the communication face.

The principal advantage of the invention is that of obtaining, under determined operating conditions, the balancing of the various axial efforts acting on the cylinder-block, and consequently of reducing and even eliminating the resultant of said axial efforts. In this way, the bearing device may have dimensions smaller than those of the bearing device of the heretofore known assemblies, while having an equal or greater operational life.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
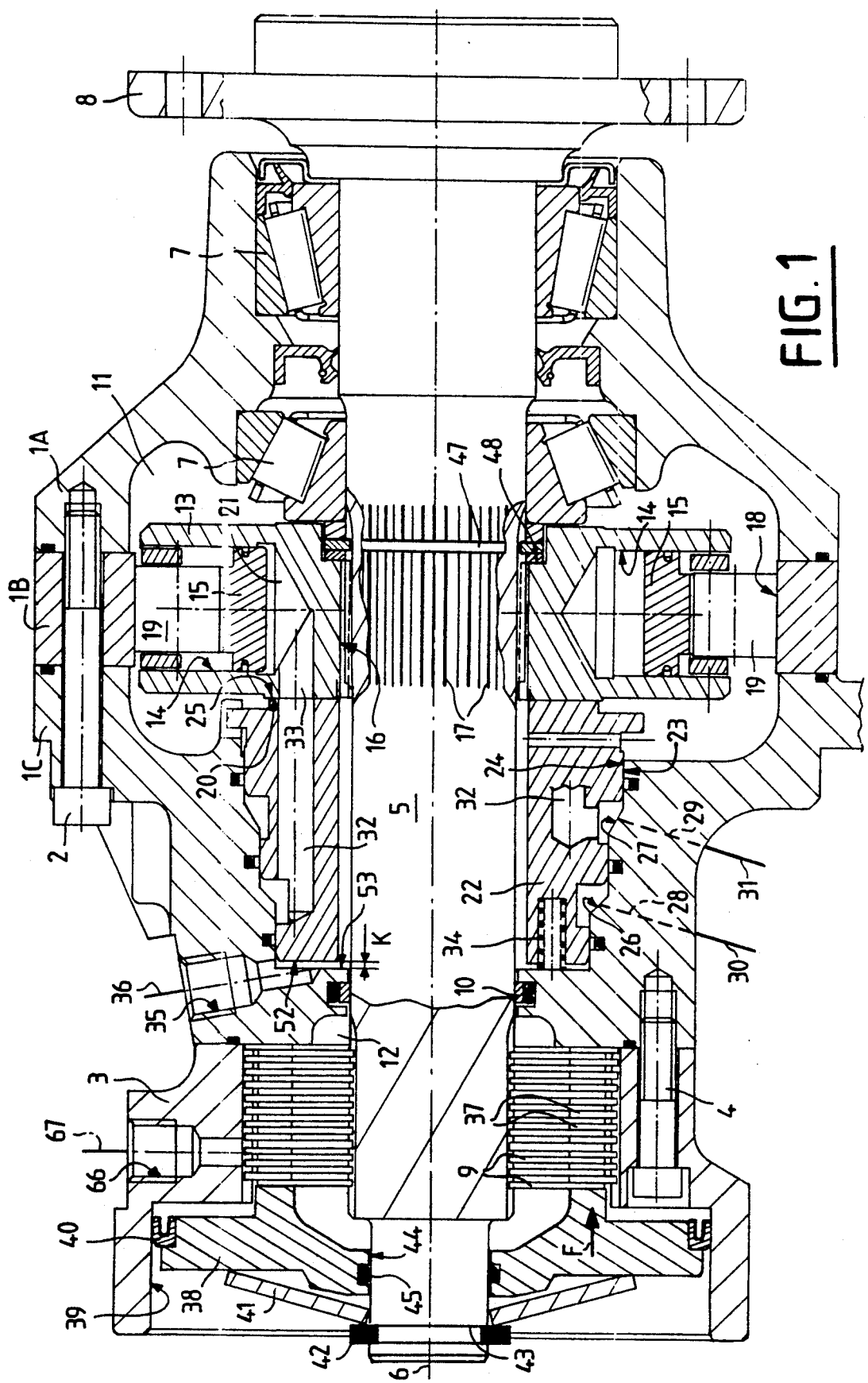
FIG. 1 is an axial section through an assembly of a hydraulic motor and of a brake in accordance with a first embodiment of the invention.

Referring now to the drawings, the assembly of FIG. 1 comprises:

- a motor housing in three parts 1A, 1B, 1C, assembled by screws 2;
- a brake housing 3, fixed on the motor housing by screws 4;
- a single shaft 5 mounted to rotate about a geometrical axis 6 by means of a bearing device 7 with conical rollers, this shaft 5 concomitantly constituting the output shaft of the motor, provided to that end at one of its ends with a drive flange 8, and the brake shaft provided to that end with brake discs 9 which are fast therewith in rotation;
- an O-ring 10 isolates the inner enclosure 11 of the motor housing from the inner enclosure, 12, of the brake housing;
- a cylinder-block 13 with radial cylinders 14 receiving pistons 15 is contained in the enclosure 11 and comprises an axial bore provided with splines 16 which cooperate with splines 17 on shaft 5 for assembly of said cylinder-block and its connection with the shaft 5 with respect to rotation about axis 6;
- the inner axial face of part 1B of the motor housing constitutes a lobed cam 18 on which rollers 19 with which pistons 15 are provided, are in abutment;
- the cylinder-block 13 presents a plane communication face 20 perpendicular to the axis of rotation 6, in which open out cylinder conduits 33 connecting the chambers 21 formed by the pistons 15 inside the cylinders 14 to said communication face;
- an internal fluid distributor valve 22 is mounted inside the motor housing 1A-1B-1C, presents an axial face 23 of a shape complementary, to within a small clearance, of an axial face 24 of a recess in part 1C of the motor housing, also presents a plane distribution face 25, substantially perpendicular to the axis of rotation 6, and maintained in tight abutment against the communication face 20 under the effect, in operation, of the hydraulic thrust generated by the fluids under pressure contained in two grooves 26, 27 connected by conduits 28, 29 made in part 1C of the motor housing to outer conduits 30, 31 for supply of pressurized fluid and exhaust of fluid, distribution conduits 32, made in the internal distributor valve 22, connecting said grooves 26, 27 to the distribution face 25 so as, in the course of rotation of the cylinder-block 13 with respect to the internal distributor 22, to effect periodic communication of each cylinder conduit 33 successively with groove 26 and with groove 27;
- spring (studs) 34 likewise tend, particularly during periods of non-operation of the motor, to place the distribution face 25 in abutment against the communication face 20;
- a connection 35 connects the enclosure 11 to an outer conduit 36 for evacuation towards a discharge reservoir for the fluid possibly contained in said enclosure;
- brake discs 37 are fast, with respect to rotation about axis 6, with the brake housing 3 and are interposed between the discs 9 so that the stack of discs 9 and 37 may receive a braking thrust and develops a braking force on shaft 5;
- the brake housing 3 is obturated by a lid 38 disposed transversely, adapted to slide in a bore 39 of the brake housing 3 with the interposition of an O-ring 40, and traversed by the shaft (bore 44) with the interposition of another O-ring 45;
- an elastic washer 41, interposed between a stop ring 42 contained in a groove 43 made in the end of the shaft 5 opposite the flange 8, and the lid 38, acts on the latter in the direction of arrow F provoking thrust of discs 9, 37 of the stack of discs and the braking of the shaft 5 with respect to the brake housing 3;
- a groove 46, made in the splines 17 of the shaft 5, transversely to the axis of rotation 6, receives a circlip 47 capable of abutting on the face 48 of a shoulder of the cylinder block 13, with the interposition of an adjustment ring 49, the face 48 of said shoulder being oriented in the direction opposite that of the communication face 20 of the cylinder-block 13;
- another ring 50 is disposed between the circlip 47 and the cage 51 of the bearing 7 closest to the cylinder-block 13 and ring 50 has a thickness chosen so that, upon a thrust of the internal fluid distributor valve 22, via its distribution face 25, on the communication face 20 of the cylinder-block 13, the cylinder-block 13 pushing the adjusting ring 49, itself pushing the circlip 47, which, in turn, pushes ring 50, the latter is in contact with the cage 51 of said bearing 7, so that a clearance J is always preserved between the cylinder-block 13 and said cage 51 of bearing 7;
- a connection 66 connects chamber 12 of the brake housing to an outer conduit 67, placed in selective communication with a source of fluid under pressure and with a discharge reservoir, or isolated from said reservoir and source of fluid.

It should be noted that the transverse face 52 of the inner fluid distributor valve 22, opposite the distribution face 25, is disposed opposite a transverse face 53 defining a recess in which the inner fluid distributor valve is contained. A minimum clearance K is maintained between said transverse faces 52 and 53.

Figure 2:
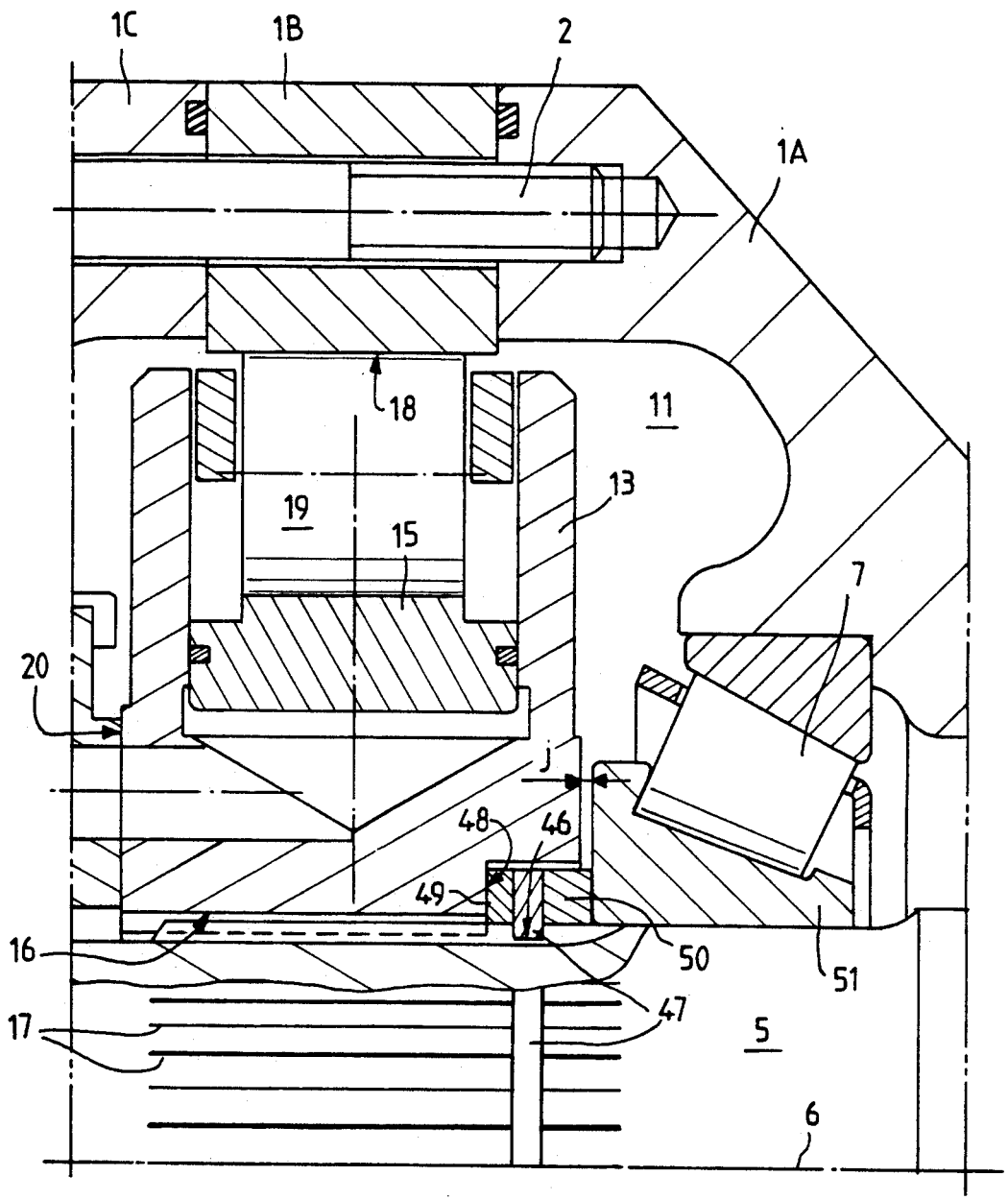
FIG. 2 is an enlargement of a detail of the assembly of FIG. 1.
Figure 3:
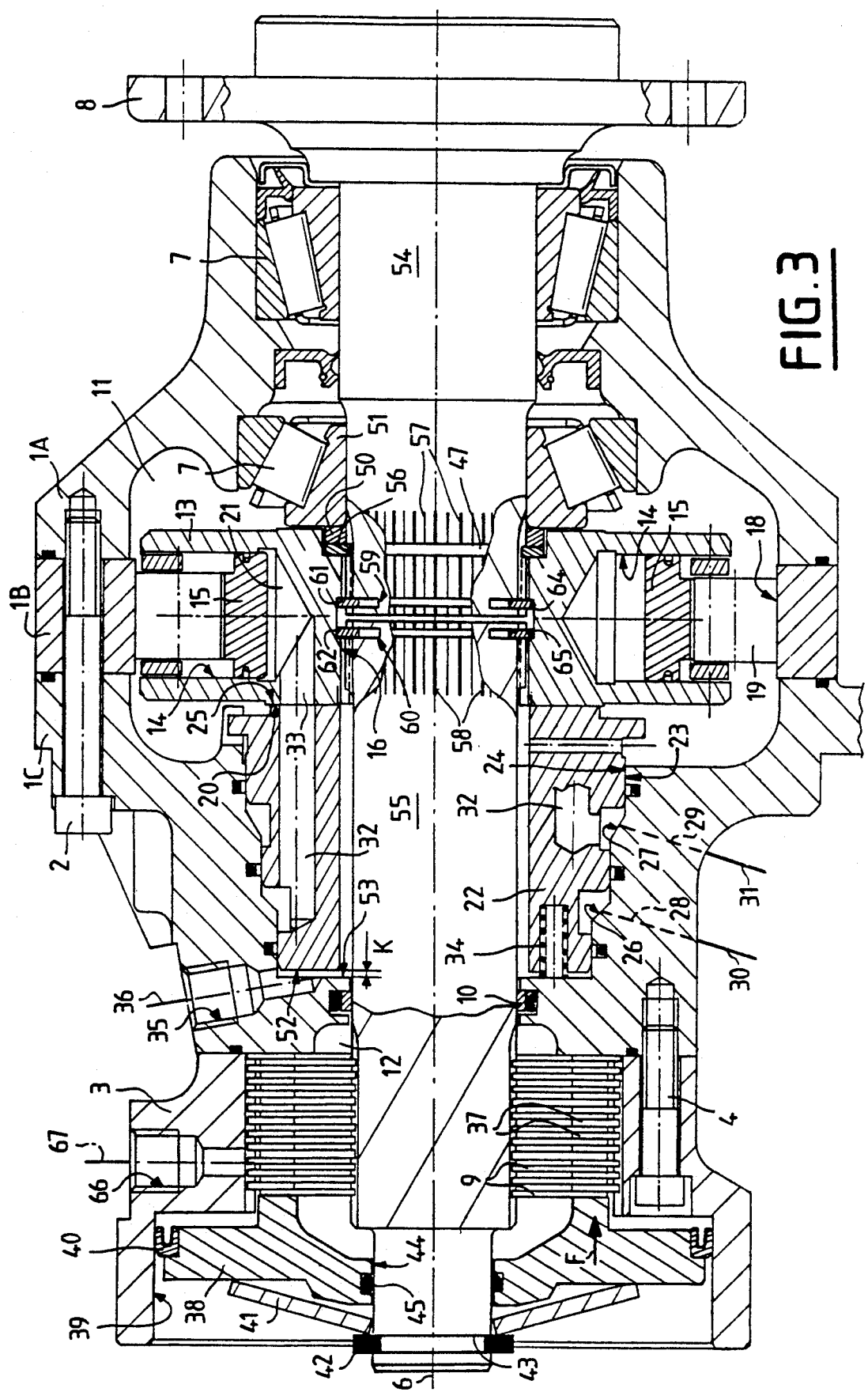
FIG. 3 is an axial section, similar to that of FIG. 1, through an assembly of a hydraulic motor and of a brake in accordance with a second embodiment of the invention.
Figure 4:
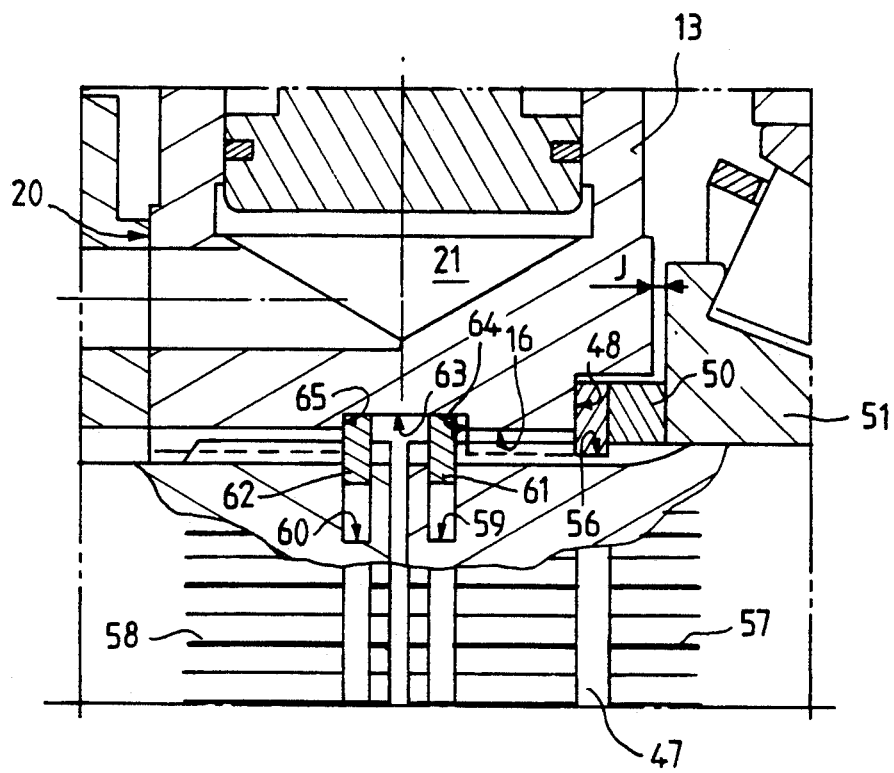
FIG. 4 is an enlargement of a detail of the assembly of FIG. 3.

The embodiment of FIGS. 3 and 4 is identical to that of FIGS. 1 and 2 and the identical arrangements are designated by the same reference numerals, except concerning the following arrangements:

- the single shaft is replaced by an output shaft 54 of the motor, mounted to rotate with respect to the motor housing 1A-1B-1C by means of the bearing device 7, and by a brake shaft 55 which are distinct, but coaxial, with axes merging with the geometrical axis 6 of rotation;
- the brake discs 9 are fast with the brake shaft 55;
- face 48 of the cylinder-block 13 is directly disposed opposite the circlip 47, without interposition of ring 49 of the embodiment of FIGS. 1 and 2, the circlip 47 being contained in a transverse groove 56 made in splines 57 with which the inner end of the output shaft 54 is provided;
- the clearance J is maintained between the cylinder-block 13 and the cage 51 of the roller bearing 7 thanks to the choice of the thickness of the ring 50;
- the splines 57 cooperate with splines 16 of the cylinder-block 13 to render said cylinder-block 13 and the output shaft 54 fast in rotation;
- the inner end of the brake shaft 55 is itself provided with splines 58 which cooperate with the splines 16 of the cylinder-block 13 and render the cylinder-block 13 and the brake shaft 55 fast in rotation;

in splines 57, 58 are made with two transverse grooves 59, 60 which receive segments 61, 62 respectively;

a large groove 63, presenting a first transverse shoulder 64 having the same orientation as the communication face 20 of the cylinder-block 13, and a second transverse shoulder 65 of opposite orientation, is made in the splines 16 and in the cylinder-block 13, and receives those parts of the segments 61, 62 projecting out of the grooves 59, 60, segment 61 being disposed opposite the shoulder 64 and capable of abutting thereon, segment 62 itself being disposed opposite the shoulder 65 and capable of abutting thereon.

Figure 5:
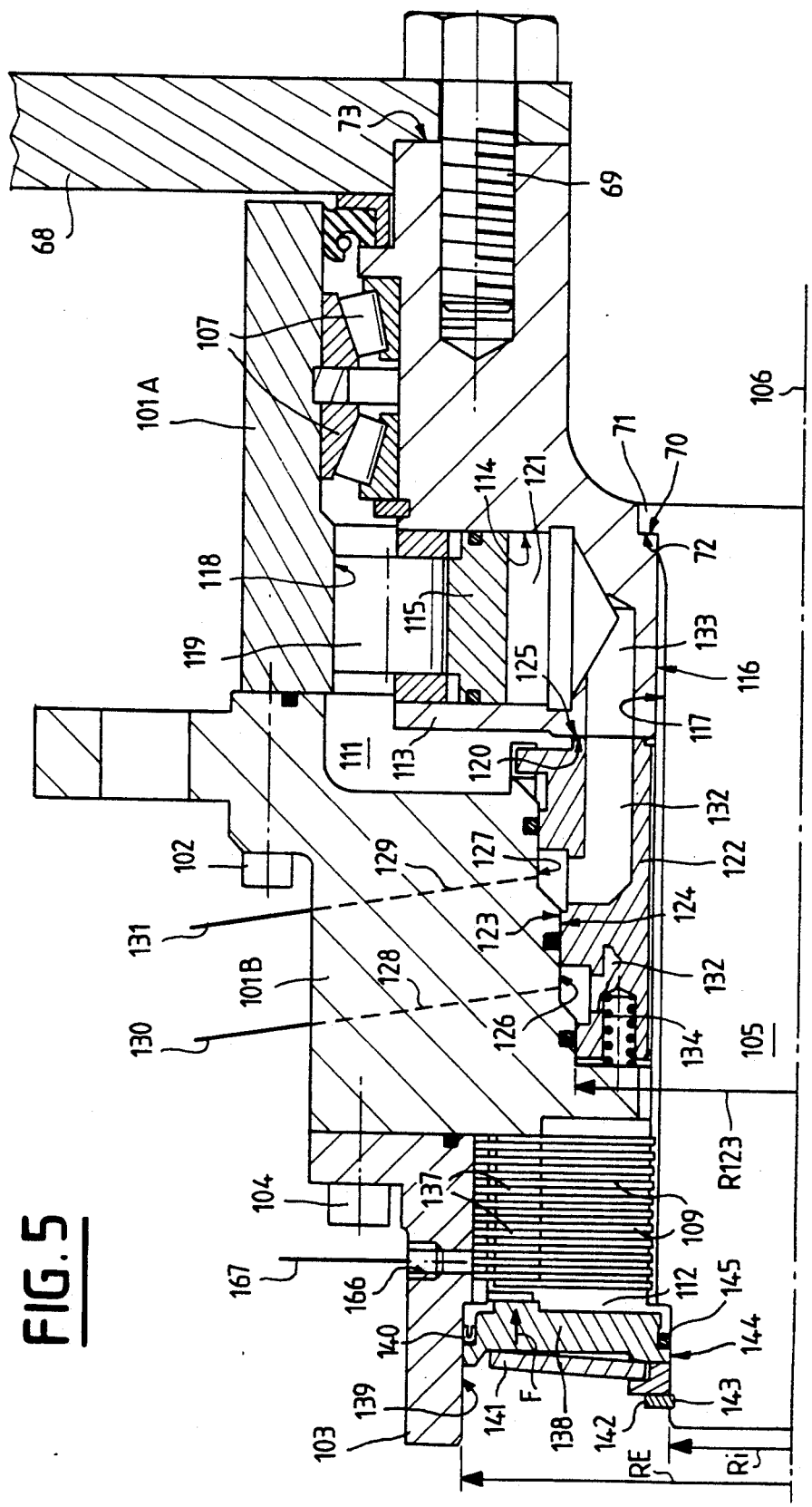
FIG. 5 is an axial section through an assembly of a hydraulic motor and of a brake in accordance with a third embodiment of the invention.

The embodiment of FIG. 5 comprises:

a motor housing in two parts 101A, 101B, assembled by screws 102;

a brake housing 103; fixed on the motor housing by screws 104;

a cylinder-block 113 with radial cylinders 114 receiving pistons 115 is contained in the inner enclosure 111 of the motor housing and comprises an axial bore provided with splines 116, which cooperate with the splines 117 of a shaft 105 in order to effect connection of the shaft 105 and of the cylinder block 113 with respect to a rotation about axis 106 merged with the axis of shaft 105;

the inner axial face of part 101A of the motor housing comprises a lobed cam 118 on which rollers 119, with which the pistons 115 are provided, are in abutment;

the cylinder-block 113 presents a plane communication face 120, perpendicular to the axis of rotation 106, in which open out cylinder conduits 133 connecting the chambers 121 made by the pistons 115 inside the cylinders 114 to said communication face;

an internal fluid distributor valve 122 is mounted inside the motor housing 101A-101B, presents an axial face 123 of a shape complementary, to within a small clearance, of an axial face 124 of a recess in part 101B of the motor housing, likewise presents a plane distribution face 125, substantially perpendicular to the axis of rotation 106, and maintained in tight abutment against the communication face 120 under the effect, in operation, of the hydraulic thrust generated by the fluids under pressure contained in two grooves 126, 127 connected by conduits 128, 129 made in part 101B of the motor housing to outer conduits 130, 131 for supply of pressurized fluid and for exhaust of fluid, distribution conduits 132 made in the internal distributor valve 122, connecting said grooves 126, 127 to the distribution face 125 so as, in the course of relative rotation of the internal distributor valve 122 with respect to the cylinder-block 113, to effect periodic communication of each cylinder conduit 133 successively with groove 126 and with groove 127;

springs (studs) 134 likewise tend, particularly during periods of non-working of the motor, to place the distribution face 125 in abutment against the communication face 120;

brake discs 109 are fast in rotation with the shaft 105 which therefore constitutes a brake shaft;

brake discs 137 are fast, with respect to rotation about axis 106, with the brake housing 103 and are interposed between the discs 109, so that the stack of discs 109 and 137 may receive a braking thrust and develop a braking force on shaft 105;

the brake housing 103 is obturated by a lid 138 disposed transversely, adapted to slide in a bore 139 of the brake housing 103 with the interposition of an O-ring 140, and traversed by the shaft 105 (bore 144) with the interposition of another O-ring 145;

an elastic washer 141, interposed between the lid 138 and a circlip 142 contained in a groove 143 made in the end of the shaft 105 acts on the lid 138 in the direction of arrow F provoking thrust of the discs 109, 137 of the stack of discs and braking of the shaft 105 with respect to the brake housing 103;

the cylinder-block 113 is mounted for rotation about the geometrical axis 106 by means of a bearing device 107 with conical rollers and is, in addition, provided with an end 73 for fixation by screws 69 on an outer frame 68;

the cylinder-block 113 is in addition provided with a shoulder 70 of orientation opposite that of the communication face 120;

that end of the brake shaft 105 opposite the one supporting the brake discs 109 is itself provided with a flange 71 which is integral with the brake shaft 105 and of which one face 72 is disposed opposite the shoulder 70 and is capable of being placed in abutment against this shoulder 70;

a connection 166 connects chamber 112 of the brake housing to an outer conduit 167 placed in selective communication with a source of pressurized fluid and with a discharge reservoir, or isolated from said reservoir and source of fluid.

The various embodiments shown all comprise a hydraulic motor whose functioning is known, without it being necessary to describe it in detail except for recalling that the shapes of grooves 26, 27; 126, 127 are chosen so that, during operation of the motor, the pressures of the fluids contained in these grooves generate on the internal distributor valve 22, 122 a thrust, in direction F, for abutment of the distribution face 25; 125 against the communication face 20; 120 of the cylinder-block, respectively.

This hydrostatic thrust is great since it attains the values of 10 to 30 kilo Newton depending on the motors.

It may also be observed that, if the force of the elastic washer 41, 141 acts on the stack of the discs with a view to obtaining braking of shaft 5, 105 with respect to the brake housing 3, 103 in the direction of arrow F, the hydraulic effort of brake release acting on the lid 38, 138, forming a piston, acts in the opposite direction, i.e. likewise in the direction opposite that of said hydrostatic thrust on the internal distributor valve 22, 122, respectively.

In each of the embodiments described and shown, the effort of brake-release is, of course, transmitted firstly to the braking thrust member constituted by the lid 38, 138, then, from lid 38, 138 to the brake shaft 5, 55 via the stop rings 42, 142; finally, from the brake shaft to the cylinder-block 13, 113 via, in the embodiment of FIGS. 1 and 2, the circlip 47, in the embodiment of FIGS. 3 and 4, the circlip 62 and, in the embodiment of FIG. 5, the flange 71.

Finally, it is noteworthy that the brake-release effort which is therefore transmitted to the cylinder-block and is in a direction opposite the hydrostatic thrust transmitted to the cylinder-block by the internal fluid distributor valve, is generated at the precise moment when the user controls operation of the motor and when said hydrostatic thrust is therefore developed.

In each of the embodiments described, the effect of the hydrostatic thrust acting on the internal fluid distributor valve 22, 122 and transmitted to the cylinder-block 13, 113 is antagonistic to the effort of brake-release. In the configuration corresponding to nominal working of the motor, it suffices to render equal, or substantially equal, the value of the effort of brake-release and that of the sum of the axial efforts acting moreover on the cylinder-block 13, 113 for the resultant on the cylinder-block to be low and even zero and for no axial effort or a weak axial effort to be transmitted to the bearing device 7, 107. This device may thus have dimensions smaller than those which it should have if, as in the heretofore known embodiments, it had to take up the sum of the efforts, other than that of brake-release, transmitted to the cylinder-block, or the device can have an increased operational life.

Simply, the resultant of the effort acting on the cylinder-block may have a zero value thanks to the judicious choice of the outer (RE) and inner (RI) radii of the lid 38, 138 and, in the embodiment of FIG. 5, of the smallest radius R123 of the axial face 123 of the internal fluid distributor valve 122 as a function of determined pressures of the fluid in the grooves 26 and 27; 126 and 127 and of the hydraulic brake-release pressure.

In the embodiment of FIGS. 1 and 2, the brake shaft 5 transmits the brake-release effort to the cylinder-block 13 via the circlip 47. The brake-release effort is calculated so that, in all cases of working of the motor, the resultant of the efforts acting on the cylinder-block 13 is oriented in the direction of arrow F or, at most, zero. In this way, the cylinder-block 13 cannot push the internal fluid distributor valve 22 in the direction opposite that of arrow F1, thus eliminating the risk of cancelling the clearance K, of bringing face 52 and face 53 into contact, of hindering the mobility of the distributor valve 22 and therefore of disturbing the working of the motor and even of damaging the motor.

In the embodiment of FIGS. 3 and 4, this risk is eliminated by the retention of the cylinder-block effected by the bearing device 7 and by the circlip 61 cooperating to that end with the shoulder 64.

Thanks to the characteristic arrangement of the invention, the bearing devices 7, 107 must withstand axial efforts less than those of the prior known arrangements, this leading to savings in weight, dimensions, operation life and in cost of the embodiments according to the invention.

The invention is not limited to the embodiments described, but covers, on the contrary, all variants which may be made thereto without departing from their scope nor spirit.

What is claimed is:

1. An assembly of a hydraulic motor and a brake comprising:
   a motor frame,
   a rotatable brake shaft,
   a hydraulic motor including a cylinder-block connected for common rotation with said brake shaft, fluid distributor valve means for controlling flow of fluid to and from said cylinder-block to operate said hydraulic motor and comprising jack means for urging a distribution face on said valve means against a communication face of said cylinder-block,
   a bearing between said frame and said cylinder-block, said bearing receiving a thrust force from said jack means via said valve means and said cylinder-block, said thrust force acting in a direction substantially parallel to an axis of rotation of said brake shaft,
   two groups of braking members, one group secured to said frame, and the other group secured to said brake shaft,
   means for producing relative axial movement between said brake shaft and said frame to engage the two groups of braking members during a braking operation,
   brake release means for producing relative axial movement between said brake shaft and said frame to disengage the two groups of the braking members when the brakes are released, and
   means connecting the brake shaft and the cylinder-block for common axial movement by said brake release means, when the brakes are released, to produce an axial force acting on said cylinder-block in a direction opposite said thrust force to relieve the effect of the thrust force acting on said bearing.

2. The assembly of claim 1, wherein said brake shaft includes two shaft portions connected together for common rotation, one shaft portion being connected to said other group of braking members, the other of said shaft portions being an output motor shaft portion, said means connecting the brake shaft to the cylinder-block comprising means connecting said output motor shaft portion and said cylinder-block.

3. The assembly of claim 2, further comprising means connecting said two shaft portions together for common axial movement at least in one direction to produce said axial force opposite said thrust force.

4. The assembly of claim 1, wherein said means connecting the brake shaft and the cylinder-block for common axial movement comprises a radial flange on said brake shaft facing said cylinder-block to abut thereagainst when the brakes are released.

5. The assembly of claim 1, wherein said thrust force and said force acting opposite said thrust force are substantially equal.

6. The assembly of claim 1, wherein said means connecting said brake shaft and said cylinder-block for common axial movement comprises clip means on said brake shaft extending radially thereof and fitted axially between said cylinder-block and said bearing.

7. An assembly of a hydraulic motor and of a brake, comprising:
   a motor frame;
   a cylinder-block mounted to rotate about an axis of rotation and maintained axially in position at least in one direction with respect to the frame by a bearing device, and provided with a plane communication face perpendicular to the axis of rotation;
   an internal fluid distributor valve, provided with a plane distribution face, generally in abutment against the communication face of the cylinder-block, jacks capable of containing fluids under pressure, being interposed between the frame and the internal fluid distributor valve and capable of generating a thrust for abutment of the distribution face against the communication face;
   two groups of braking members, the braking members of a first of the two groups being fast in rotation with the motor frame, and the braking members of the second group being fast in rotation with a brake shaft itself fast in rotation with the cylinder block;

an axial thrust member for controlling braking, with displacement parallel to the axis of rotation, coupled to the brake shaft so as to be fast therewith with respect to a translation of said thrust member parallel to the axis of rotation, in a direction opposite that of the thrust producing abutment of the distribution face against the communication face;

a device for controlling the braking coupled to the thrust member and capable of generating thereon an axial braking thrust during a braking operation;

a brake-release jack coupled between the motor frame and the thrust member, with effect antagonistic to that of the braking controlling device, capable of generating on the thrust member an axial thrust in a direction opposite that of the thrust producing abutment of the distribution face against the communication face; and means for making the brake shaft fast, with respect to a translation of said brake shaft parallel to the axis of rotation, with the cylinder-block, in the direction opposite that of the thrust producing abutment of the distribution face against the communication face during a brake release operation.

8. The assembly of claim 7, wherein the motor comprises an output shaft which is mounted to rotate and be maintained axially in position with respect to the motor frame via said bearing device, while the cylinder-block is fast with respect to rotation with said output shaft and is capable of being rendered fast with said output shaft with respect to a translation of said output shaft parallel to the axis of rotation, at least in the direction opposite that of the thrust producing abutment of the distribution face against the communication face.

9. The assembly of claim 8, wherein the brake shaft is fast with the output shaft with respect to a translation of said brake shaft parallel to the axis of rotation, at least in the direction opposite that of the thrust producing abutment of the distribution face against the communication face.

10. The assembly of claim 9, wherein the brake shaft and the output shaft constitute a single shaft.

11. The assembly of claim 7, wherein the bearing device is directly interposed between the motor frame and the cylinder-block, and a shoulder, fast with the brake shaft, is capable of being placed in axial abutment against the cylinder-block during a translation of said brake shaft in a direction opposite that of the thrust producing abutment of the distribution face against the communication face.

12. The assembly of claim 7, wherein said bearing device is interposed between said motor frame and said brake shaft, said bearing device having a face receiving a first thrust force, via said cylinder-block, acting in the direction of the thrust producing abutment of the distribution face against the communication face, said cylinder-block receiving a second thrust force, via said brake release jack and said means which makes said brake shaft fast with the cylinder-block, acting in the direction opposite said first thrust force.

13. The assembly of claim 12, wherein said first and second thrust forces acting on said cylinder-block produce a resultant thrust force of substantially zero on said face of said bearing device.

14. The assembly of claim 7, wherein said means which makes the brake shaft fast with the cylinder block upon translation of the brake shaft parallel to the axis of rotation comprises clip means on said shaft axially fitted between said cylinder block and said bearing device.

15. The assembly of claim 7, wherein said means which makes the brake shaft fast with the cylinder block upon translation of the brake shaft parallel to the axis of rotation comprises a radial flange on said brake shaft in axial abutment with said cylinder block.

* * * * *